(12) United States Patent
Meiller et al.

(10) Patent No.: US 6,896,852 B1
(45) Date of Patent: May 24, 2005

(54) HYDROCARBON BLEED EMISSION SCRUBBER WITH LOW RESTRICTION

(75) Inventors: Thomas C. Meiller, Pittsford, NY (US); Charles H. Covert, Manchester, NY (US); Susan S. LaBine, Avon, NY (US)

(73) Assignee: Delphi Technologies, Inc., Troy, MI (US)

( * ) Notice: Subject to any disclaimer, the term of this patent is extended or adjusted under 35 U.S.C. 154(b) by 819 days.

(21) Appl. No.: 09/696,988

(22) Filed: Oct. 26, 2000

Related U.S. Application Data
(60) Provisional application No. 60/192,917, filed on Mar. 29, 2000.

(51) Int. Cl.[7] .................. B01D 53/04; B01D 53/34; F02M 33/02; B01J 20/00; B60L 1/02
(52) U.S. Cl. .................. 422/180; 123/519; 502/416; 219/202
(58) Field of Search .................. 422/168, 177, 422/180; 502/417, 427, 436, 180, 518, 527, 19, 416; 55/523, 524; 219/202, 206; 392/491; 123/516, 519, 520, 521

(56) References Cited

U.S. PATENT DOCUMENTS

| | | | | |
|---|---|---|---|---|
| 3,352,294 A | * | 11/1967 | Skarstrom et al. | 123/519 |
| 3,730,158 A | * | 5/1973 | St. Amand | 123/519 |
| 3,964,875 A | * | 6/1976 | Chang et al. | 422/176 |
| 4,112,898 A | * | 9/1978 | Takimoto et al. | 123/521 |
| 4,308,840 A | * | 1/1982 | Hiramatsu et al. | 123/519 |
| 4,386,947 A | * | 6/1983 | Mizuno et al. | 96/137 |
| 5,148,793 A | * | 9/1992 | Reddy | 123/520 |
| 5,453,118 A | * | 9/1995 | Heiligman | 96/147 |
| 5,743,943 A | * | 4/1998 | Maeda et al. | 96/126 |
| 5,800,787 A | * | 9/1998 | Kato et al. | 422/174 |
| 5,806,500 A | * | 9/1998 | Fargo et al. | 123/520 |
| 5,851,268 A | * | 12/1998 | Hyodo et al. | 96/131 |
| 5,861,611 A | * | 1/1999 | Kato et al. | 219/552 |
| 5,914,294 A | * | 6/1999 | Park et al. | 502/417 |
| 5,957,114 A | * | 9/1999 | Johnson et al. | 123/519 |
| 5,966,929 A | * | 10/1999 | Socha, Jr. | 60/274 |
| 6,097,011 A | * | 8/2000 | Gadkaree et al. | 219/553 |
| 6,230,693 B1 | * | 5/2001 | Meiller et al. | 123/519 |
| 6,237,574 B1 | * | 5/2001 | Jamrog et al. | 123/519 |

* cited by examiner

*Primary Examiner*—Kevin P. Kerns
(74) *Attorney, Agent, or Firm*—Jimmy L. Funke

(57) ABSTRACT

A hydrocarbon emissions scrubber for use in an evaporative emissions control system of a motor vehicle includes a scrubber element having an elongate body. The body defines a plurality of passageways for the flow of fluid therethrough. The plurality of passageways are one of coated with or constructed of a sorbent material. The sorbent material is adsorptive of hydrocarbons.

6 Claims, 5 Drawing Sheets

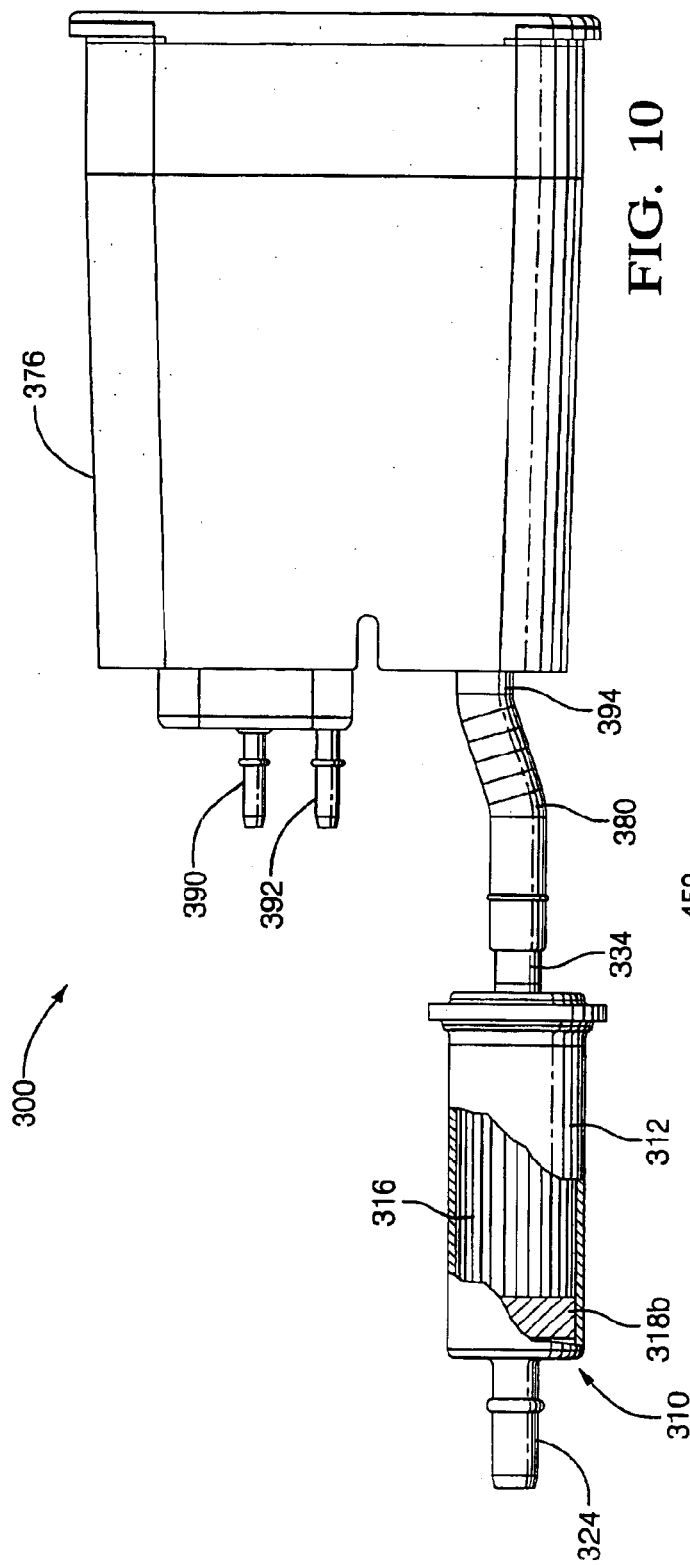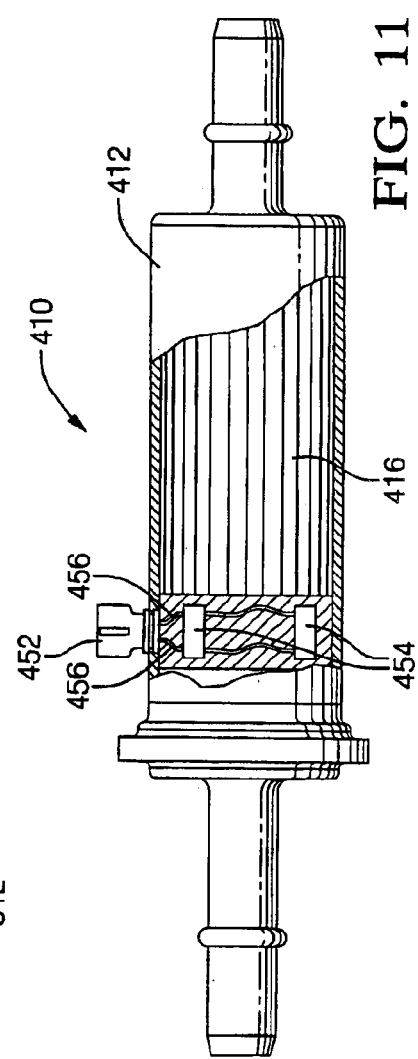

HYDROCARBON BLEED EMISSION SCRUBBER WITH LOW RESTRICTION

CROSS REFERENCE TO RELATED APPLICATIONS

This application claims the benefit of U.S. Provisional Patent Application Ser. No. 60/192,917, filed Mar. 29, 2000.

TECHNICAL FIELD

The present invention relates to evaporative emissions control systems in motor vehicles.

BACKGROUND OF THE INVENTION

Motor vehicles emit hydrocarbons as a result of the evaporation of fuel. Generally, such evaporative emissions result from the venting of fuel vapors from the fuel tank due to diurnal changes in ambient pressure and/or temperature, the vaporization of fuel by a hot engine and/or exhaust system, and the escape of fuel vapors during refueling of the vehicle. The venting of fuel vapor from the fuel tank due to diurnal pressure and/or temperature changes (i.e., diurnal emissions) is responsible for a majority of evaporative emissions. Diurnal changes in pressure and/or temperature cause air to flow into and out of the fuel tank. Air flowing out of the fuel tank inevitably carries fuel vapor which is created by the evaporation of fuel into the air contained above the fuel within the fuel tank. If this flow of air is left untreated and is allowed to escape directly into the atmosphere, undesirable emissions occur.

One way in which motor vehicle manufacturers have reduced the level of diurnal emissions is through the use of evaporative canisters. A detailed discussion of the structure and operation of an evaporative canister is presented in U.S. Pat. No. 5,910,637, the disclosure of which is incorporated herein by reference.

Generally, an evaporative canister has a vapor inlet, a purge port and a vent port. The vapor inlet is fluidly connected by a vapor conduit to the air space in the fuel tank. Diurnal changes in pressure and/or temperature causes air within the fuel tank to flow through the vapor conduit and into the evaporative canister via the vapor inlet. The air carries fuel vapor and/or hydrocarbons. The evaporative canister contains a sorbent material, such as an activated carbon, that strips fuel vapor from the air as it flows through the canister. The treated air then flows out the vent port and into the in atmosphere. The purge port is fluidly connected by a valved purge conduit to the combustion air intake of the motor vehicle engine. When the engine is running, the combustion air intake is at sub-atmospheric pressure, and the valve is opened to thereby connect the purge port to the combustion air intake. Fresh air is drawn by the sub-atmospheric pressure through the vent port and into the evaporative canister. The fresh air flows through the sorbent material, out the purge port and into the combustion air intake. The flow of fresh air through the evaporative canister strips the sorbent material of stored fuel vapor and/or hydrocarbons, thereby purging the evaporative canister of hydrocarbons.

However, minute levels of hydrocarbons remain stored in the sorbent material of a purged evaporative canister. Bleed emissions are believed to result from the release of these stored hydrocarbons (i.e., the hydrocarbon heel) from the evaporative canister into the atmosphere. Bleed emissions typically occur, for example, during the heating of the fuel tank during a diurnal cycle. The heating of the fuel tank causes air to flow from the fuel tank, through the canister, out the vent port and into the atmosphere. The air carries the hydrocarbon heel out of the canister and into the atmosphere, thereby resulting in the release of bleed emissions.

In order to reduce bleed emissions some motor vehicles employ an auxiliary canister. The auxiliary canister is placed in series with and further filters the treated air flowing out the vent port of the main evaporative canister. The auxiliary canister typically uses the same sorbent material, i.e., granular or pelletized carbon, as is used in the main evaporative canister to thereby increase the hydrocarbon capacity of the evaporative emission control system. However, in order to achieve sufficient hydrocarbon capacity, auxiliary canisters are generally highly restrictive to the flow of air. Thus, the auxiliary canister must be bypassed in order to be compatible with vehicle refueling vapor recovery systems. Bypassing an auxiliary canister requires the addition of valving and conduits to the evaporative emissions control system, and thus adds cost and complexity to the system. Furthermore, the restrictive air flow characteristics of the auxiliary canister makes purging the volume of sorbent material inefficient, especially in small displacement engines. Moreover, vehicles which incorporate a more efficient evaporative canister and/or an auxiliary canister typically do not reduce bleed emissions to a level required to classify the vehicle as a Super Ultra Low Emissions Vehicle (SULEV) or as a Practically Zero Emissions Vehicle (PZEV).

Therefore, what is needed in the art is a device which reduces the bleed emissions of an evaporative canister and/or the combination of an evaporative canister and an auxiliary canister.

Furthermore, what is needed in the art is a device which reduces the bleed emissions from an evaporative canister and has a low flow restriction, thus rendering the device compatible with vehicle refueling vapor recovery systems.

Yet further, what is needed in the art is a device which reduces bleed emissions from an evaporative canister and has a low flow restriction, thereby increasing purge efficiency.

Even further, what is needed in the art is a device which reduces bleed emissions from an evaporative canister and which has a higher efficiency than an auxiliary canister utilizing carbon pellets or granules.

SUMMARY OF THE INVENTION

The present invention provides a hydrocarbon emissions scrubber for use in an evaporative emissions control system of a motor vehicle.

The invention comprises, in one form thereof, a hydrocarbon emissions scrubber including a scrubber element having an elongate body. The body defines a plurality of passageways for the flow of fluid therethrough. The plurality of passageways are one of coated with or constructed of a sorbent material. The sorbent material is adsorptive of hydrocarbons.

An advantage of the present invention is that bleed emissions from an evaporative canister are substantially reduced.

Another advantage of the present invention is the hydrocarbon emissions scrubber is substantially less restrictive to the flow of fluid than a typical auxiliary canister, thereby rendering the device compatible for use in evaporative emissions control systems which incorporate refueling vapor recovery and eliminating the need for complex bypass valving and conduits.

A still further advantage of the present invention is the hydrocarbon emissions scrubber has a higher efficiency than an auxiliary canister.

BRIEF DESCRIPTION OF THE DRAWINGS

The above-mentioned and other features and advantages of this invention, and the manner of attaining them, will become apparent and be better understood by reference to the following description of one embodiment of the invention in conjunction with the accompanying drawings, wherein:

FIG. 10 is a plan, partially sectioned view of a second embodiment of an evaporative emissions assembly of the present invention; and FIG. 11 is a plan, partially sectioned view of a fourth embodiment of a hydrocarbon bleed emissions scrubber of the present invention.

Corresponding reference characters indicate corresponding parts throughout the several views. The exemplification set out herein illustrates one preferred embodiment of the invention, in one form, and such exemplification is not to be construed as limiting the scope of the invention in any manner.

DESCRIPTION OF THE PREFERRED EMBODIMENT

Figure 1:
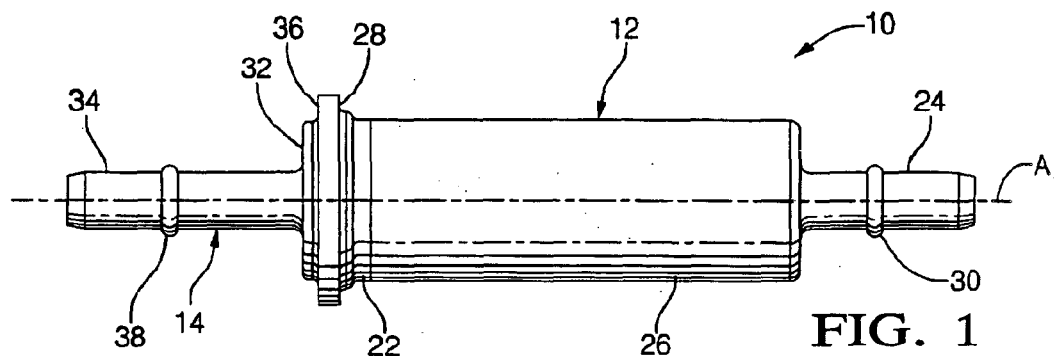
FIG. 1 is a plan view of one embodiment of a hydrocarbon bleed emissions scrubber of the present invention.
Figure 2:
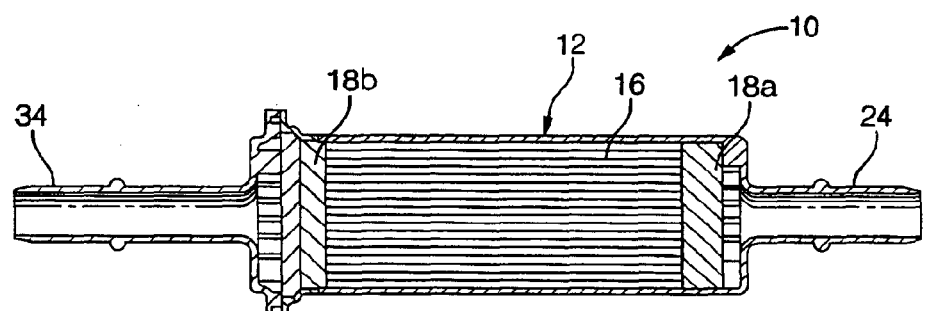
FIG. 2 is a longitudinally sectioned view of the hydrocarbon bleed emissions scrubber of FIG. 1.

Referring now to the drawings, and particularly to FIGS. 1 and 2, there is shown one embodiment of a hydrocarbon emissions scrubber of the present invention. Hydrocarbon emissions scrubber 10 (hereinafter referred to as HC scrubber 10) includes housing 12, cap 14, scrubber element 16, and flow diffusers 18a and 18b. Generally, and as will be described more particularly hereinafter, HC scrubber 10 is for use in an evaporative emissions control system of a motor vehicle. HC scrubber 10 is fluidly connected to an evaporative canister of the evaporative emissions control system, and strips residual fuel vapor and/or hydrocarbons from the air flowing from the evaporative canister before discharging the air into the atmosphere.

Housing 12 is an elongate, substantially cylindrical cup-shaped member having longitudinal central axis A. Housing 12 includes open, flanged end 22, tubular housing end 24 and cylindrical sidewall 26. Flanged end 22 and tubular housing end 24 are interconnected by substantially cylindrical side wall 26. Flange 28 surrounds housing 12 adjacent flanged end 22. Flange 28 is configured to be coupled to cap 14 in an airtight manner, such as, for example, by threadingly engaging or snap-fitting to cap 14. Tubular housing end 24 extends axially from housing 12 at the end thereof which is opposite flanged end 22. Tubular housing end 24 defines a passageway for the flow of air and fuel vapor into and/or out of housing 12. Tubular housing end 24 is slidingly received within a conduit (not shown), and includes barb 30 which resists axial movement of the conduit in a direction away from housing 12. Housing 12 receives scrubber element 16 and flow diffusers 18a, 18b, such that each of scrubber element 16 and flow diffusers 18a, 18b are surrounded by cylindrical side wall 26. Housing 12 is constructed of, for example, an injection molded plastic or other suitable material that is substantially resistant to degradation due to exposure to fuel and fuel vapors.

Cap 14 includes rim end 32 having tubular cap end 34 extending axially therefrom. Rim end 32 includes a substantially saucer-shaped rim 36. Rim 36 is configured to be coupled to flanged end 22 of housing 12 in an air tight manner, such as, for example, threadingly and/or snap-fitting to flange 28 of flanged end 22. Tubular cap end 34 defines a passageway for the flow of air and fuel vapor through cap 14 into and/or out of housing 12. With cap 14 coupled to flanged end 22 of housing 12, a channel for the flow of fluid through housing 12 is defined by tubular housing end 24, tubular cap end 34 and cylindrical side wall 26. Tubular cap end 34 is configured to be slidingly received within a conduit (not shown), and includes barb 38 which resists axial movement of the conduit in a direction away from housing 12.

Figure 3A:
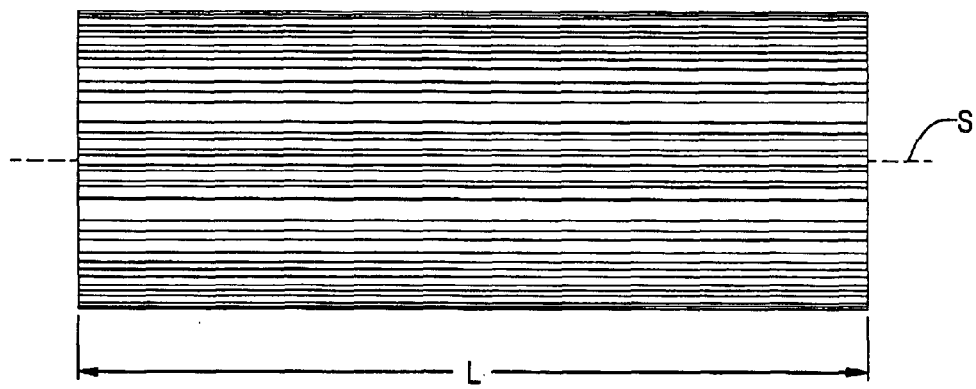
FIG. 3A is a longitudinally sectioned view of the scrubber element of FIG. 2.
Figure 3B:
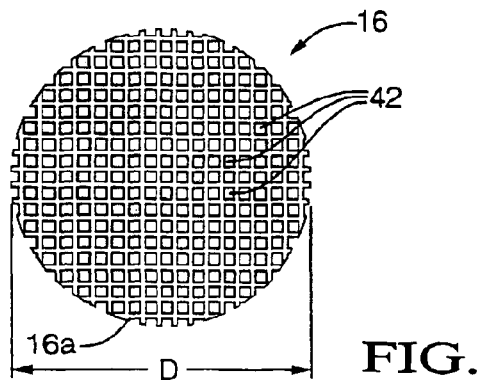
FIG. 3B is a cross-sectional view of the scrubber element of FIG. 2.
Figure 6:
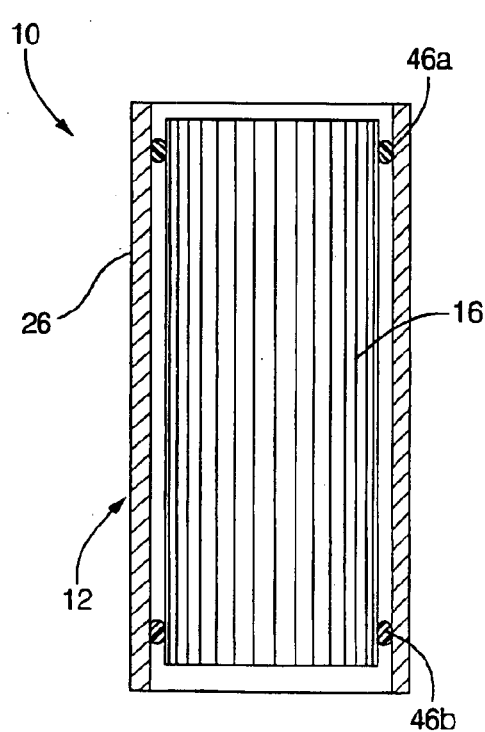
FIG. 6 is a longitudinally sectioned view of the hydrocarbon bleed emissions scrubber of FIG. 1.

Scrubber element 16 is an elongate, substantially cylindrical body and is disposed within housing 12. Referring now to FIGS. 3A and 3B, scrubber element 16 has central axis S, a predetermined length L and diameter D. Scrubber element 16 has, in cross-section, a matrix or honeycomb-like structure, and defines a plurality of axial or longitudinal passageways 42 which extend in an axial direction from one end (not referenced) to the other end, i.e., through the entire length L, of scrubber element 16. Disposed between scrubber element 16 and sidewall 26 of housing 12 are resiliently-deformable seals 46a and 46b (FIG. 6). Seals 46a and 46b sealingly engage sidewall 26 to thereby direct fluid and/or air flow through passageways 42 of scrubber element 16 and to prevent fluid and/or air flow through any gap between scrubber element 16 and sidewall 26. Thus, seals 46a and 46b ensure that substantially all of the air and/or fluid flowing into and/or out of housing 12 flows through scrubber element 16. Scrubber element 16 is constructed of a sorbent material 16a, such as, for example, activated carbon. At least the inside surface of each of passageways 42 is formed of or covered with sorbent material 16a. Preferably, scrubber element 16 is extruded from, for example, a slurry-like mixture of sorbent material 16a and a binder.

Flow diffusers 18a and 18b are substantially cylindrical disks that are porous to the flow of air and fuel vapor. Flow diffuser 18a is disposed within housing 12 intermediate scrubber element 16 and tubular housing end 24 such that one side or face (not referenced) of flow diffuser 18a is disposed adjacent to scrubber element 16 and the other face is proximate to tubular housing end 24. Flow diffuser 18b is disposed within housing 12 intermediate scrubber element 16 and cap 14 such that one face of flow diffuser 18b is disposed adjacent scrubber element 16 and the other face is disposed proximate flanged end 22 of housing 12 and proximate to rim 36 of cap 14. Each of flow diffusers 18a and 18b are constructed of, for example, a reticulated foam or other suitable material.

Figure 4:
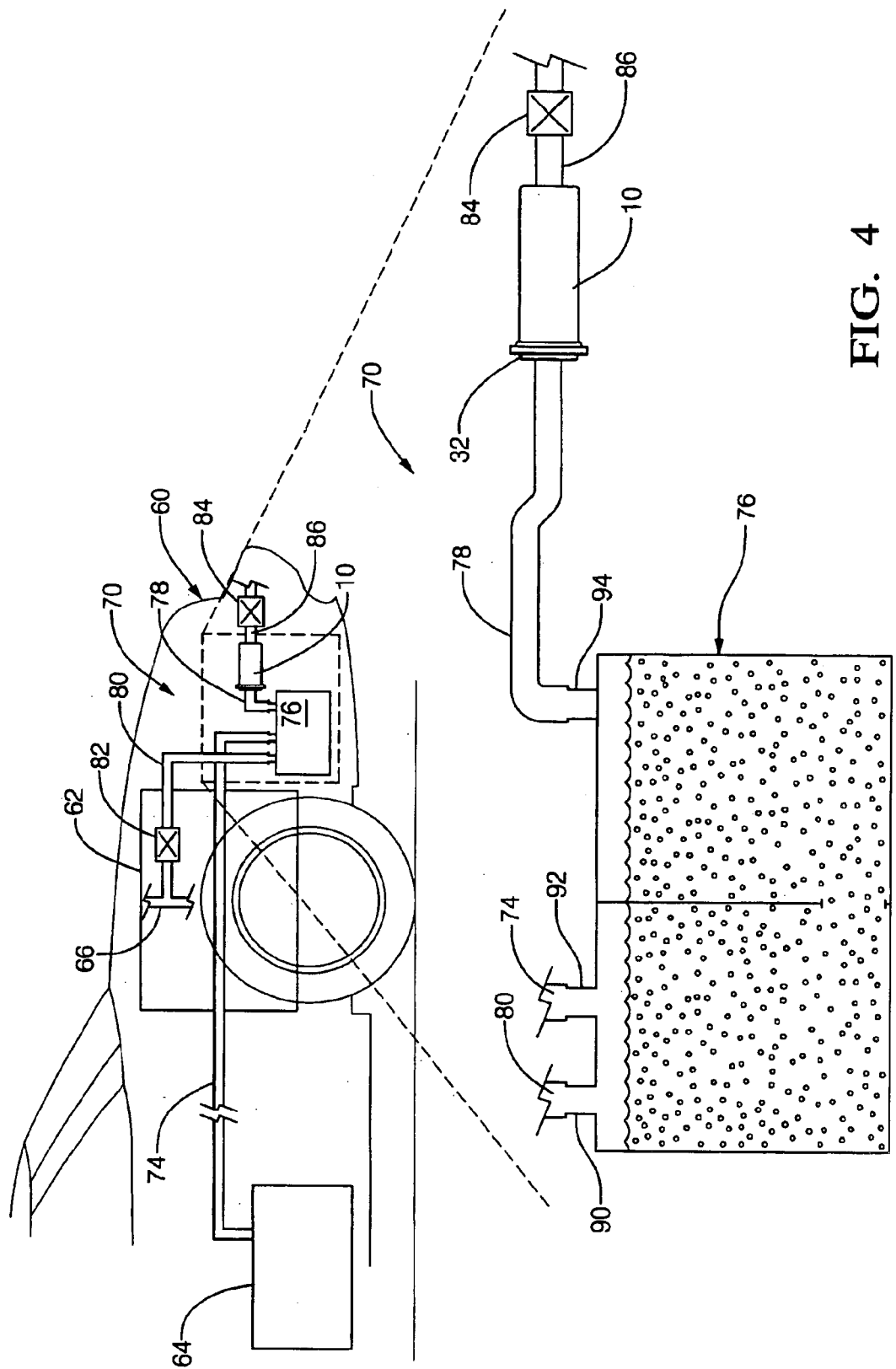
FIG. 4 is a schematic diagram of one embodiment of an evaporative emissions control system including the hydrocarbon bleed emissions scrubber of FIG. 1.

Referring now to FIG. 4, one embodiment of an evaporative emissions control system in accordance with the present invention is shown. Motor vehicle 60 includes internal combustion engine 62 and fuel tank 64. Internal combustion engine 62 has combustion air intake 66. Evaporative emissions control system 70 includes, in addition to HC scrubber 10, vapor conduit 74, evaporative canister 76, vent conduit 78, purge conduit 80, purge valve 82, vent valve 84, and air conduit 86.

Evaporative canister 76 includes purge port 90, vapor inlet port 92 and vent port 94. Purge port 90 is fluidly connected to combustion air intake 66 by purge conduit 80. Purge valve 82 is disposed in fluid communication with purge conduit 80 between purge port 90 and combustion air intake 66, such as, for example, within purge conduit 80, and is operable to selectively control the flow of fuel vapor through purge conduit 80 from purge port 90 to combustion air intake 66. Purge valve 82 is open, for example, when internal combustion engine 62 is running. Vapor inlet port 92 is fluidly connected to fuel tank 64 by vapor conduit 74. Vent port 94 is fluidly connected to HC scrubber 10 by vent conduit 78. More particularly, vent conduit 78 is fluidly coupled at one end to vent port 94 and at the other end to tubular cap end 34 of HC scrubber 10. Tubular housing end 24 of HC scrubber 10 is fluidly coupled to vent valve 84 by air conduit 86. Vent valve 84 is disposed between HC scrubber 10 and an air intake and/or discharge assembly (not shown), such as, for example, within air conduit 86. Vent valve 84 is operable to selectively control the flow of air through air conduit 86 into and/or out of HC scrubber 10. Vent valve 84 is normally open, and can be selectively closed in conjunction with purge valve 82 to perform various functions, such as, for example, leak detection and vacuum testing of evaporative emissions control system 70. Each of vent valve 84 and purge valve 82 are electrically connected to, for example, an engine control module (not shown), and open and close in response to signals issued by the engine control module.

In use, HC scrubber 10 is incorporated within evaporative emissions control system 70, and adsorbs hydrocarbons from the bleed emissions flowing out vent port 94 of evaporative canister 76. More particularly, as fuel tank 64 is subjected to diurnal changes in temperature and/or pressure, vapor pressure within fuel tank 64 forces air out of fuel tank 64. The flow of air carries fuel vapor. The air and fuel vapor flow through vapor conduit 74 and into evaporative canister 76. The air and fuel vapor flow through sorbent media (not referenced) contained within evaporative canister 76. The sorbent media strips the hydrocarbons from the air flow. The treated air flows out vent port 94. However, the air flowing out vent port 94 contains bleed emissions. As stated above, bleed emissions are believed to result from the hydrocarbon heel present in the sorbent material of a purged evaporative canister and typically occur during a diurnal cycle. Thus, the air flowing out vent port 94 contains hydrocarbon heel-based or bleed emissions. The bleed emissions are further removed from the flow of air by HC scrubber 10, thereby reducing the level of hydrocarbons/bleed emissions emitted by evaporative emissions control system 70 relative to a conventional evaporative emissions control system.

Figure 5:
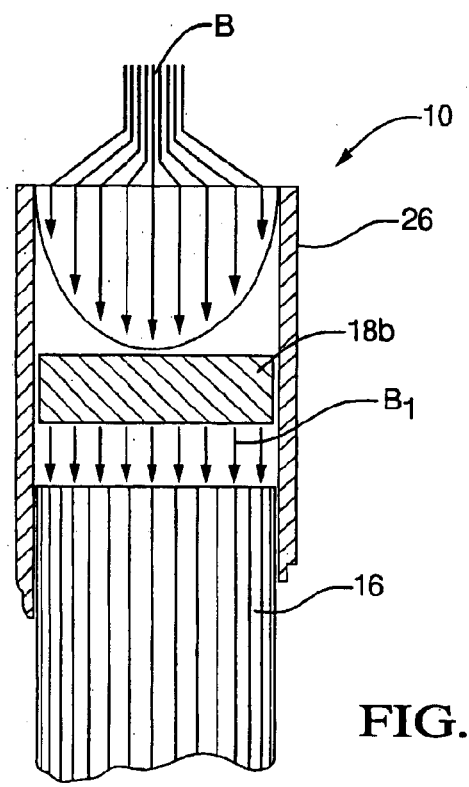
FIG. 5 is a fragmentary, longitudinally sectioned view of the hydrocarbon bleed emissions scrubber of FIG. 1.

The bleed emissions flow into HC scrubber 10 from vent port 94 of evaporative canister 76. More particularly, bleed emissions from evaporative canister 76 flow out vent port 94, through vent conduit 78 and into tubular cap end 34 of HC scrubber 10. The bleed emission flow through flow diffuser 18b which, as shown in FIG. 5, distributes the flow of bleed emissions B uniformly across the cross-sectional area of scrubber element 16 thereby ensuring an even and uniform flow of bleed emissions $B_1$ relative to the cross-sectional area of scrubber element 16. The uniformly-distributed flow of bleed emissions $B_1$ substantially equally loads each of passageways 42 with bleed emissions, and exposes the bleed emissions to the cumulative surface area of passageways 42. Each of passageways 42 are lined with or constructed of sorbent material 16a. Thus, the surface area of sorbent material 16a to which the bleed emissions are exposed is maximized, thereby maximizing the capacity of scrubber element 16 to adsorb and store hydrocarbons, through the uniform distribution of bleed emissions by flow diffuser 18b. The cleansed air exits HC scrubber 10 through tubular housing end 24, then through air conduit 86 and vent valve 84, and into the atmosphere.

HC scrubber 10 is purged through normal operation of internal combustion engine 62. At least a portion of the air drawn into combustion air intake 66 flows into and through HC scrubber 10, and purges HC scrubber 10 of accumulated hydrocarbons. More particularly, during normal operation of engine 62, purge valve 82 is opened thereby fluidly connecting purge port 90 to combustion air intake 66 of internal combustion engine 62. Combustion air intake 66 is at subatmospheric pressure during normal operation of internal combustion engine 62. Vent port 94 is in fluid communication with purge port 90 and, thus, with the subatmospheric pressure present at combustion air intake 66. The subatmospheric pressure present at combustion air intake 66, vent port 94 and purge port 90 draws fresh air in through vent port 94. More particularly, fresh air is drawn into air conduit 86, through vent valve 84 and into tubular housing end 24 of HC scrubber 10. The air is drawn into HC scrubber 10 and through flow diffuser 18a, which distributes the flow of fresh air uniformly across the cross-sectional area of scrubber element 16 thereby ensuring an even and uniform flow of fresh air through each of passageways 42 as described above in regard to flow diffuser 18b. The uniform distribution of the fresh air flow relative to the cross-sectional area of scrubber element 16 purges the stored bleed emissions/hydrocarbons from sorbent material 16a which lines each of passageways 42. Thus, the efficiency with which scrubber element 16 and sorbent material 16a is purged of stored hydrocarbons is maximized.

Similarly, evaporative canister 76 of evaporative emissions control system 70 is purged by the flow of fresh air drawn by the vacuum present at combustion air intake 66. The air is drawn through HC scrubber 10 and into evaporative canister 76 through vent port 94. The air flows through the sorbent material contained within evaporative canister 76 thereby purging same of stored hydrocarbons. The air is further drawn by the vacuum out purge port 90, and carries with it the hydrocarbons purged from each of evaporative canister 76 and HC scrubber 10. The purge air is drawn through purge conduit 90 and into combustion air intake 66 of engine 62. The purged air and/or hydrocarbons are drawn into combustion air intake 66 where they are mixed into and form part of the combustion charge of engine 62. Thus, the purged hydrocarbons are burned and consumed by engine 62.

Figure 8:
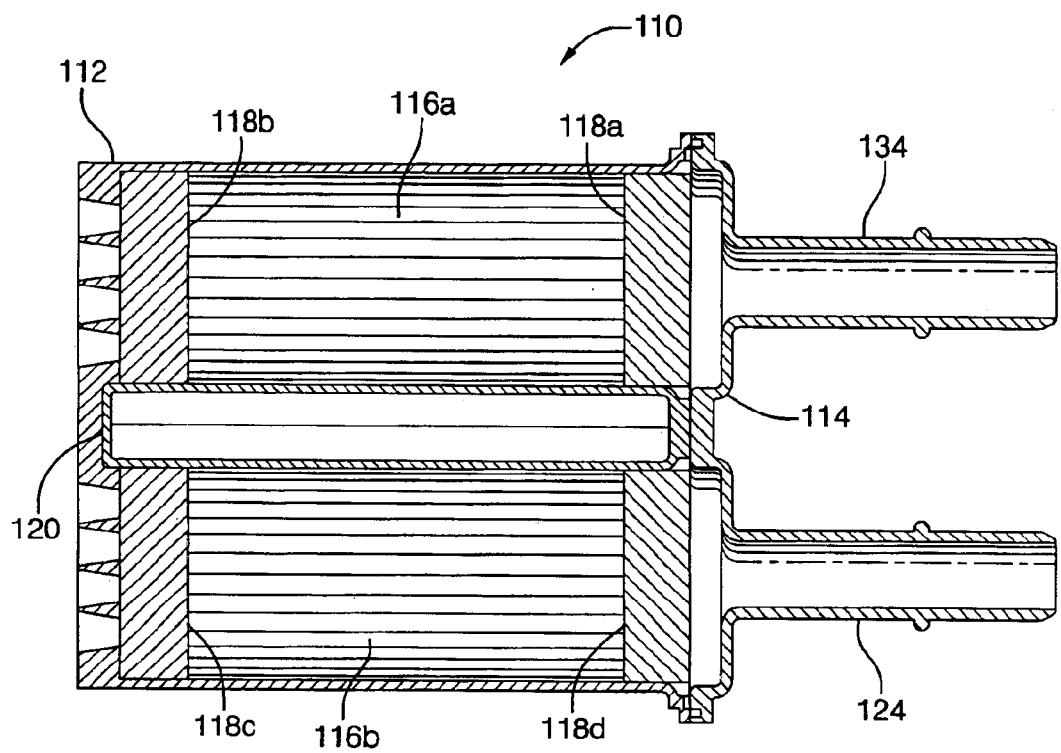
FIG. 8 is a longitudinally sectioned view of a third embodiment of a hydrocarbon bleed emissions scrubber of the present invention.

Referring now to FIG. 8, a second embodiment of an HC scrubber of the present invention is shown. HC scrubber 110, in general, enables the same amount of sorbent material to be incorporated into a package which occupies less space than is occupied by HC scrubber 10. Alternatively, HC scrubber 110 enables a substantial increases in the amount sorbent material within a housing which occupies approximately the same space as occupied by HC scrubber 10. More particularly, HC scrubber 110 includes housing 112, cap 114, scrubber elements 116a and 116b, and flow diffusers 118a, 118b, 118c and 18d.

Cap 114 engages housing 112 in an air and fluid tight manner, such as, for example, by snap-fitting onto housing 112 as described above in regard to housing 12 and cap 14 of HC scrubber 10. Scrubber elements 116a, 116b are each disposed within housing 112. Scrubber elements 116a and 116b are placed in series relative to the flow of bleed emissions, such that bleed emissions will flow first through scrubber element 116a and then through scrubber element 116b. Flow diffusers 118a, 118b are associated with opposite ends of scrubber element 116a, while flow diffusers 118c, 118d are associated with opposite ends of scrubber element 116b. Flow diffusers 118a, 118b, 118c, and 118d serve the same purpose as described above in regard to flow diffusers 18a and 18b of HC scrubber 10, i.e., the even distribution of the flow of air and bleed emissions relative to the cross-sectional area of scrubber elements 116a and 116b. Each of scrubber elements 116a and 116b are spaced apart by spacing wall 120 of housing 112. Spacing wall 120 guides the flow of bleed emissions and ensures scrubber elements 116a and 116b are in series relative to the flow of bleed emissions. HC scrubber 110 includes cap 114 having tubular housing end 124 and tubular cap end 134, which serve as the inlet and outlet for the flow of bleed emissions into housing 112.

Figure 9:
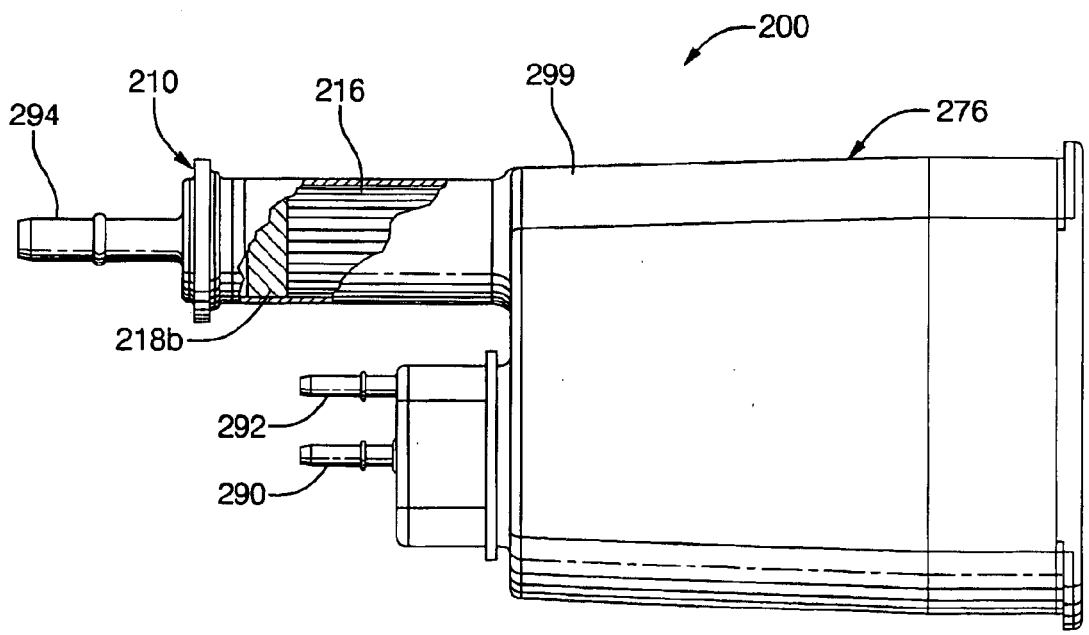
FIG. 9 is a plan, partially sectioned view of one embodiment of an evaporative emissions assembly of the present invention.

Referring now to FIG. 9, one embodiment of an evaporative emissions assembly of the present invention is shown. Generally, evaporative emissions assembly 200 integrates into a single housing an evaporative emissions canister and an HC scrubber in accordance with the present invention. More particularly, evaporative emissions assembly 200 includes evaporative canister 276 and HC scrubber 210, each of which are disposed within housing 299. Evaporative canister 276 includes purge port 290, vapor inlet port 292 and vent port 294. Evaporative canister 276 contains sorbent material (not shown). Purge port 290 and vapor inlet port 292 are essentially conventional in design and configuration, and are respectively substantially similar in function to purge port 90 and inlet port 92 as discussed above in regard to evaporative canister 76. Vent port 294 forms a passageway for the flow of air into and out of evaporative canister 276. HC scrubber 210 is disposed intermediate and is in fluid communication with each of vent port 294 and evaporative canister 276, such that air flowing into and/or out of evaporative canister 276 through vent port 294 must flow through HC scrubber 210. HC scrubber 210 includes scrubber element 216 and flow diffusers 218a, 218b (only one shown) disposed on opposite ends of scrubber element 216. Scrubber element 216 and flow diffusers 218a, 218b are each substantially similar to scrubber element 16 and flow diffusers 18a, 18b, respectively, as discussed above in regard to HC scrubber 10.

In use, fresh air is drawn into and treated air flows out of evaporative emissions assembly 200 through vent port 294 of evaporative canister 276. HC scrubber 210 is disposed in fluid communication with vent port 294 and evaporative canister 276 such that fresh/purge air flowing into and bleed emissions flowing from evaporative canister 276 must flow through HC scrubber 210. Thus, purge/fresh air entering and bleed emission exiting evaporative emissions assembly 200 must flow through scrubber element 216. As bleed emissions flow through scrubber element 216, hydrocarbons are stripped therefrom by scrubber element 216 in substantially the same manner as discussed above in regard to scrubber element 16 of HC scrubber 10. Further, purge/fresh air is selectively drawn through vent port 294 and into evaporative canister 276, such as, for example, by a vacuum or a combustion air intake fluidly connected to purge port 292. The purge/fresh air flows through scrubber element 216 thereby purging scrubber element 216 of stored hydrocarbons in a manner substantially similar to the purging of scrubber element 16, as described above in regard to HC scrubber 10.

Referring now to FIG. 10, a second embodiment of an evaporative emissions assembly of the present invention is shown. Generally, and similarly to evaporative emissions assembly 200, evaporative emissions assembly 300 integrates into a single assembly an evaporative emissions canister and HC scrubber 310. More particularly, evaporative emissions assembly 300 includes evaporative canister 376 and HC scrubber 310. Evaporative canister 376 contains sorbent material (not shown), and includes purge port 390, vapor inlet port 392 and vent port 394. Purge port 390, vapor inlet port 392 and vent port 394 are, respectively, substantially similar in function to purge port 90, inlet port 92 and vent port 94 as discussed above in regard to evaporative canister 76. HC scrubber 310 includes housing 312, within which is disposed scrubber element 316 and flow diffusers 318a, 318b (only one shown). Each of housing 312, scrubber element 316 and flow diffusers 318a, 318b are, respectively, substantially similar to scrubber element 16 and flow diffusers 18a, 18b as discussed above in regard to HC scrubber 10. Elongate conduit 380 fluidly and mechanically interconnects vent port 394 of evaporative cannister 376 and tubular cap end 334 of HC scrubber 310.

In use, fresh/purge air is drawn into and treated air flows out of evaporative emissions assembly 300 through tubular housing end 324 of HC scrubber 310. HC scrubber 310 is disposed in fluid communication with vent port 394 of evaporative canister 376 such that fresh/purge air flowing into and bleed emission flowing from vent port 394 of evaporative canister 376 must flow through HC scrubber 310. Thus, purge/fresh air entering and bleed emission exiting evaporative emissions assembly 300 must flow through scrubber element 316.

Bleed emissions flowing from evaporative canister 376 flow through vent port 394 and into tubular cap end 334 of HC scrubber 310. The bleed emissions are channeled through scrubber element 316, which strips hydrocarbons from the bleed emissions in substantially the same manner as discussed above in regard to scrubber element 16 of HC scrubber 10. Further, purge/fresh air is selectively drawn through tubular housing end 324 into evaporative canister 376, such as, for example, by a vacuum or a combustion air intake fluidly connected to purge port 392. The purge/fresh air flows through scrubber element 316, thereby purging scrubber element 316 of stored hydrocarbons in a manner substantially similar to the purging of scrubber element 16, as described above in regard to HC scrubber 10.

Referring now to FIG. 11, yet another embodiment of an HC scrubber of the present invention is illustrated. HC scrubber 410 includes housing 412 within which is disposed scrubber element 416, each of which are, respectively, substantially similar to housing 12 and scrubber element 16 as discussed above in regard to HC scrubber 10. HC scrubber 410 further includes electrical connector 452 disposed on the outside surface of housing 412. Electrical connector 452 is, for example, integral with or attached to housing 412. Further, HC scrubber 410 includes ceramic heating elements 454. Heating elements 454 are configured as, for example, ceramic disks having electrically conductive film deposited thereon. Electrical wires 456 are connected to electrical connector 452 and to heating elements 454 to thereby supply current to each of heating elements 454. In use, the heating of the air flowing through scrubber element 416 by heating elements 454 increases the efficiency with which the fresh air purges scrubber element 416 of stored hydrocarbons.

In the embodiment shown, housing 12 and scrubber element 16 are substantially cylindrical in shape. However, it is to be understood that the housing and scrubber element may be alternately configured, such as, for example, oval, square, or of any other suitable geometry.

In the embodiment shown, scrubber element 16 is preferably extruded from a mixture of sorbent material with a binder. However, it is to be understood that the scrubber element may be alternately configured, such as, for example, an electrically conductive or semiconductive substrate that is coated or otherwise associated with a sorbent material. Further, electrical current may be conducted through such a substrate to thereby enable the substrate itself to serve as a heating element.

In the embodiment shown, the sorbent material from which the scrubber element is formed is disclosed as being, for example, an activated carbon powder. However, it is to be understood that the sorbent material may be virtually any material that is adsorptive of hydrocarbons.

Figure 7:
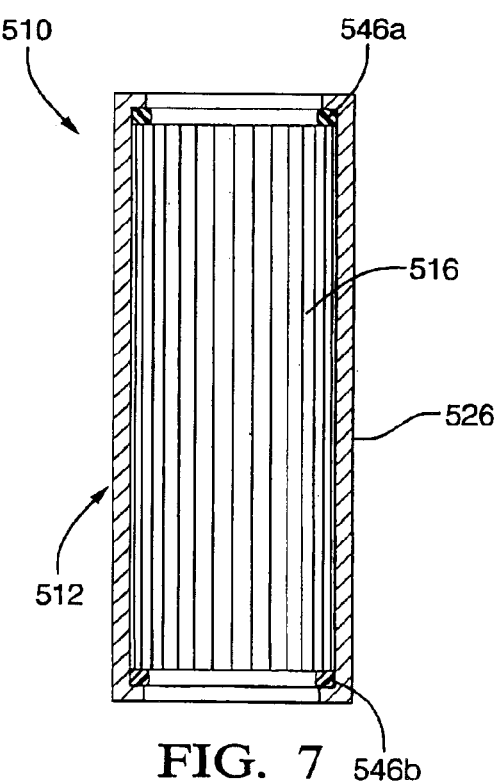
FIG. 7 is longitudinally sectioned view of a second embodiment of a hydrocarbon bleed emissions scrubber of the present invention.

In the embodiment shown, seals 46 are used to direct the flow of air and/or fluid through scrubber element 16. However, it is to be understood that the hydrocarbon emissions scrubber of the present invention can be alternately configured, such as, for example, as hydrocarbon emissions scrubber 510 having face seals 546a and 546b, as shown in FIG. 7. Face seals 546a and 546b are each disposed intermediate a respective end of scrubber element 516 and a corresponding end of housing 512 to thereby preclude air and/or fluid flow through any gap that may exist between scrubber element 516 and the inside surface of sidewall 526 of housing 512. Face seals 546a and 546b can be constructed of the same material as the housing or can be made from any suitable material that is not porous to the flow of fluid and/or air. Furthermore, in the embodiment shown, there are two seals 46a, 46b. However, it is to be understood that the hydrocarbon emissions scrubber of the present invention can be alternately configured, such as, for example, having no seals, one seal, or any number of seals.

In the embodiment shown, heating elements 454 are configured as, for example, ceramic heating elements. However, it is to be understood that the heating element or elements can be alternately configured, such as, for example, a resistive heating wire wrapped around or embedded in the scrubber element. Further, the scrubber element the may be alternately configured, such as, for example, constructed of an electrically conductive or semiconductive substrate, that is coated or otherwise associated with a sorbent material and through which electrical current may be conducted to thereby enable the substrate itself to serve as a heating element.

In the embodiment shown, evaporative emissions scrubber 16 and vent valve 84 are separate components. However, it is to be understood that the evaporative emissions scrubber may be alternatively configured, such as, for example, to include an integral vent valve, air filter, and/or pump for leak testing within the same housing.

While this invention has been described as having a preferred design, the present invention can be further modified within the spirit and scope of this disclosure. This application is therefore intended to cover any variations, uses, or adaptations of the present invention using the general principles disclosed herein. Further, this application is intended to cover such departures from the present disclosure as come within the known or customary practice in the art to which this invention pertains and which fall within the limits of the appended claims.

What is claimed is:

1. A scrubber element, comprising:
    an elongate body having a first end and a second end, said body defining a plurality of passageways for the flow of fluid therethrough from said first end to said second end, said plurality of passageways being one of coated with and constructed of a sorbent material, said sorbent material being adsorptive of hydrocarbons; and
    at least one heating element associated with said body, wherein said at least one heating element comprises a resistive heating wire.

2. The scrubber element of claim 1, wherein said body is constructed at least partially of said sorbent material.

3. The scrubber element of claim 1, wherein said body is constructed entirely of said sorbent material.

4. The scrubber element of claim 1, wherein said body is extruded from a mixture of said sorbent material and a binder.

5. The scrubber element of claim 1, wherein said sorbent material comprises an activated carbon powder.

6. The scrubber element of claim 1, wherein said at least one heating element comprises at least a portion of said elongate body, said portion being configured for conducting current therethrough.

* * * * *